Feb. 14, 1933. J. ROBERTSON ET AL 1,897,336
MILK COOLER
Filed Jan. 2, 1931
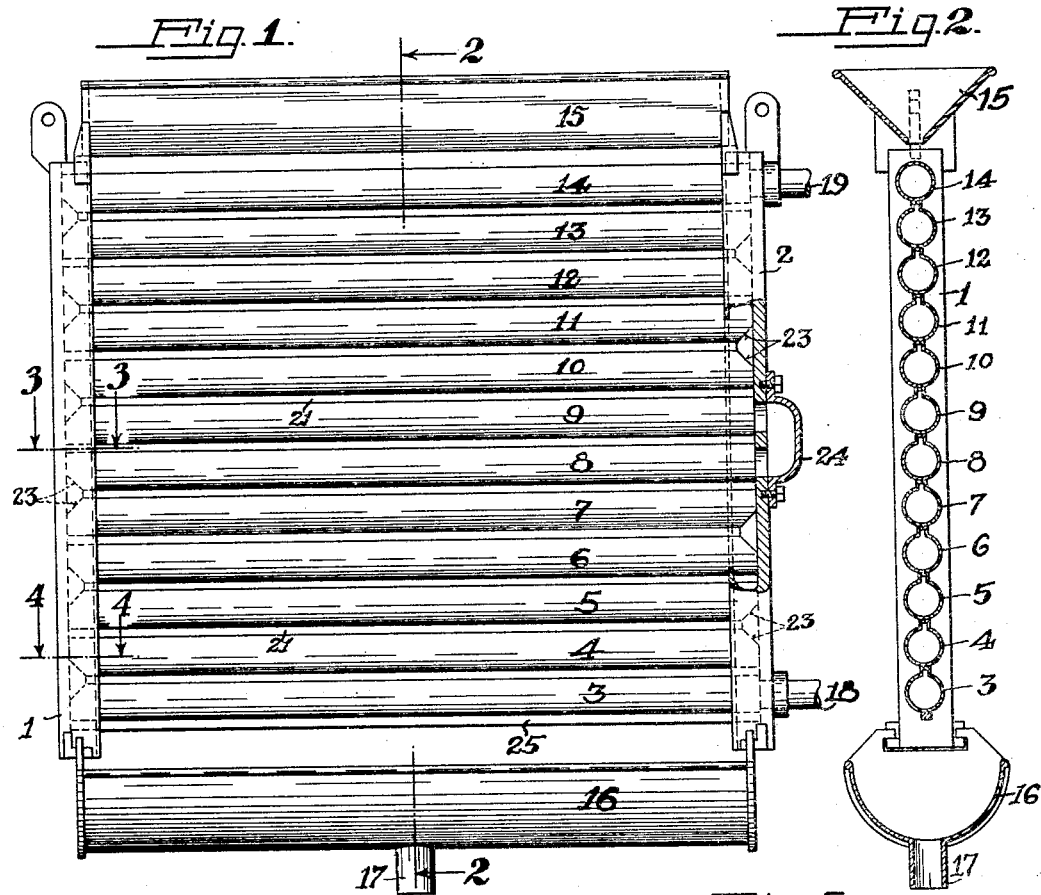
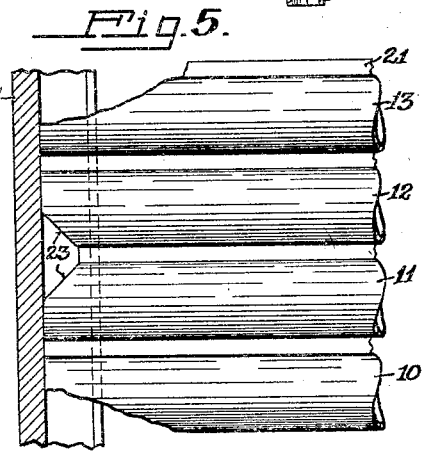
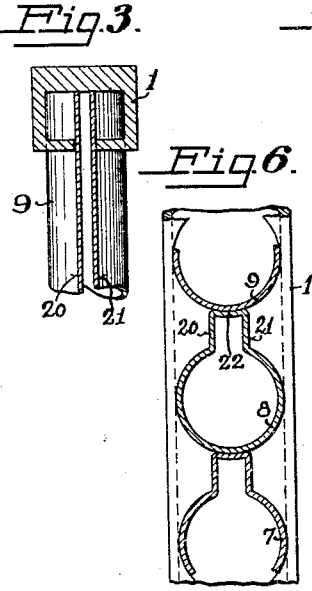

Patented Feb. 14, 1933

1,897,336

UNITED STATES PATENT OFFICE

JAMES ROBERTSON AND GEORGE H. PURDY, OF SAN FRANCISCO, CALIFORNIA

MILK COOLER

Application filed January 2, 1931. Serial No. 506,198.

This invention relates to improvements in milk coolers.

An object of our invention is to provide an improved milk cooler wherein a number of tubes of novel design and construction are arranged to give a maximum cooling area.

Another object of our invention is to provide an improved milk cooler embodying a number of novelly constructed tubes attached together and arranged in vertical alignment.

A further object of our invention is to provide an improved milk cooler comprising a pair of vertical headers having a plurality of tubes of novel construction mounted in vertical alignment between the headers, and so arranged that a cooling liquid may freely pass from one tube to an adjacent tube.

Other objects more or less apparent will be specifically pointed out or will present themselves in the description to follow:

In the accompanying drawing:

Fig. 1 is a side elevation of a cooler constructed in accordance with our invention, partly in section;

Fig. 2 is a vertical section taken on the line 2—2 of Fig. 1;

Fig. 3 is a section taken on the line 3—3 of Fig. 1;

Fig. 4 is a section taken on the line 4—4 of Fig. 1;

Fig. 5 is an enlarged fragmentary view showing a part of one of the headers in section, and parts of a number of attached tubes in elevation; and Fig. 6 is an enlarged vertical sectional view of a number of attached tubes.

Referring to the drawing the numerals 1 and 2 represent a pair of upright hollow headers having a plurality of tubes 3 to 14 inclusive, secured thereto and to one another as by solder, and arranged in series and in vertical alignment. Above the uppermost tube 14 and mounted on the headers 1 and 2, is a trough 15 into which quantities of milk to be cooled are poured, and below the lowermost tube 3 is mounted on the said headers, a drip pan 16 adapted to receive the milk passing downwardly over the tubes. The trough 15 is provided at its bottom with a number of holes through which the milk may pass, and the drip pan 16 is provided with an outlet 17 through which the milk may be discharged into a suitable receptacle. The header 2 is provided at its lower end with a liquid inlet 18 and at its upper end with an outlet 19.

Except for the uppermost tube 14, which is substantially circular in cross section, the walls of each of the other tubes at the upper side thereof extend outwardly and upwardly as at 20 and 21 to provide a hollow lip which furnishes an additional space within the tube for the passage of a cooling liquid. The parts 20 and 21 are preferably formed integrally with a slightly curved part 22 which entirely encloses the inside of the tube. The part 22 of each tube which has the same thereon, is secured as by solder to the lower side of the particular tube located above it. The solder attaching the part 22 of one tube to the curved lower side of another tube is evenly distributed along the length of the tubes so as to completely close any cracks, thereby preventing the accumulation of bacteria. The arrangement of the tubes with the part 22 of one tube secured to underneath side of an adjacent tube provides an improved closed type cooler which may be easily cleaned with a brush or other suitable implement.

So as to permit the cooling liquid entering through the inlet 18, to flow upwardly from one tube to another, we have diagonally cut away the ends of adjacent tubes, as shown at 23. It will be noticed on the drawing that the upper part of one end of the lower tube 3 and the lower part of the adjacent end of the next higher tube 4 are diagonally cut away, while the upper part of the opposite end of the said next higher tube 4 and the lower adjacent part of the end of the following higher tube 5 are also cut away as at 23. The adjacent ends of the other tubes are alternately cut away in the same manner to permit the cooling fluid to successively pass from one tube to another until it finally discharges through outlet 19. At one side of the cooler, preferably at the central part of the header 2, is provided a projecting detachable cup shaped member 24 which when removed permits the attachment of an outlet means and inlet means to the tubes 8 and 9 respectively. Such an arrangement, though not novel, permits the circulation of two separate fluids within the cooler at the same time.

The extreme ends of the said tubes are preferably cut evenly along vertical planes so they closely fit against the inside surfaces of the headers 1 and 2. The ends of the tubes at points where they contact with the headers may be soldered so as to prevent the cooling fluid from passing from one tube to another except through the diagonally cut away parts 23.

The lower tube 3 is provided at its lower side with a fin 25 which serves to guide the milk passing over the said tube, into the drip pan 16.

As the tubes are being cooled by a cooling fluid passing therethrough, the milk placed in the trough 15 passes through the holes provided in the bottom of the latter, and drops onto the upper tube 14, after which it flows downwardly over the tubes and their parts 20 and 21 into the drip pan 16. The cooler constructed with the tubes having the outwardly and upwardly disposed parts 20 and 21 thereon, provides a greater amount of efficient cooling surface over which the milk passes. Not only does such a construction present a more sturdy and efficient article of manufacture than the coolers now in use, but it also provides a device which may be readily cleaned, thus preventing bacteria accumulations which are extremely objectionable. By reason of the fact that the parts 20, 21 and 22 are located on the upper sides of the tubes, the sediment sometimes present in the cooling fluid will not be able to accumulate in the tubes but will freely pass therethrough.

It is apparent to those skilled in the art that our improved cooler may embody forms or constructions equally as satisfactory as the one herein shown and described so for this and other apparent reasons we desire our invention included broadly within the spirit of the appended claims Having described our invention what we claim is:

1. In a cooler, a pair of opposed hollow headers, a plurality of individual tubes each being substantially circular in cross section, the said tubes being connected in series by the headers, certain of the tubes having hollow lips on their upper sides, the lip of one tube being secured to a side of another tube, a trough located above the tubes and a drip pan located beneath the tubes.

2. In a cooler, a pair of opposed hollow headers, a series of tubes substantially circular in cross section and mounted in substantially vertical alignment with their ends located in the headers, the extreme ends of the tubes being in contact with walls of headers, and adjacent parts of the ends of the tubes being cut away so that a fluid may proceed from one tube to another, a trough located above the tubes and a drip pan located beneath the tubes.

3. In a cooler, a pair of spaced vertical headers having a trough mounted on their top ends and a drip pan mounted on their bottom ends, and a plurality of tubes mounted one above the other in vertical alignment with their ends located in the headers, the top tube being circular in cross section and the other tubes being substantially circular in cross-section, each of the tubes, other than top tube, having its walls extending upwardly at its top side to provide additional space within the confines of the walls of the tube, the upwardly extending parts of the wall of one tube being secured to the underneath side of another tube.

4. In a cooler, a pair of spaced vertical headers, a trough mounted at the top ends of the headers, a drip pan mounted at the bottom ends of the headers, and a plurality of tubes mounted one above the other with their ends extending inside the headers, certain of the tubes being substantially circular in cross section and having hollow lips on their top sides, the lip of one tube being secured to the underneath side of another tube.

5. In a cooler, a pair of opposed vertical hollow headers, inlet and outlet means in one of the headers, a trough mounted at the top ends of the headers, a drip pan mounted at the bottom ends of the headers, and a series of tubes mounted one above the other with their ends extending into and secured to the headers, the uppermost tube being substantially circular in cross section, and each of the other tubes being also substantially circular in cross section and having a four sided hollow lip extending lengthwise along the upper side thereof, the lip of one tube being secured to the underneath side of an adjacent tube.

6. In a cooler, a plurality of tubes connected in series, one or more of the tubes being substantially circular in cross section, having parts of its walls extending outwardly to provide an enclosed space communicating with the inside of the tube, the said outwardly disposed part of the tube being secured to the side wall of another tube.

7. In a cooler, a tube substantially circular in cross-section having its walls extending outwardly to provide two substantially parallel sides, the ends of the said sides being closed by an inwardly disposed arcuate shaped cross part formed integrally with the sides.

8. In a cooler, a pair of spaced hollow headers, a plurality of tubes arranged one above the other with their ends extending into the headers, certain of the tubes being substantially circular in cross section and having projecting hollow lips on their sides, the said lip of one tube being secured to the side wall of an adjacent tube, and liquid distributing means mounted above the tubes.

In testimony whereof we have affixed our signatures.

JAMES ROBERTSON.
GEORGE H. PURDY.